No. 828,747. PATENTED AUG. 14, 1906.
C. J. KINTNER.
SECTIONAL THIRD RAIL SYSTEM OF ELECTRIC RAILWAYS.
APPLICATION FILED OCT. 13, 1903. RENEWED JAN. 24, 1906.
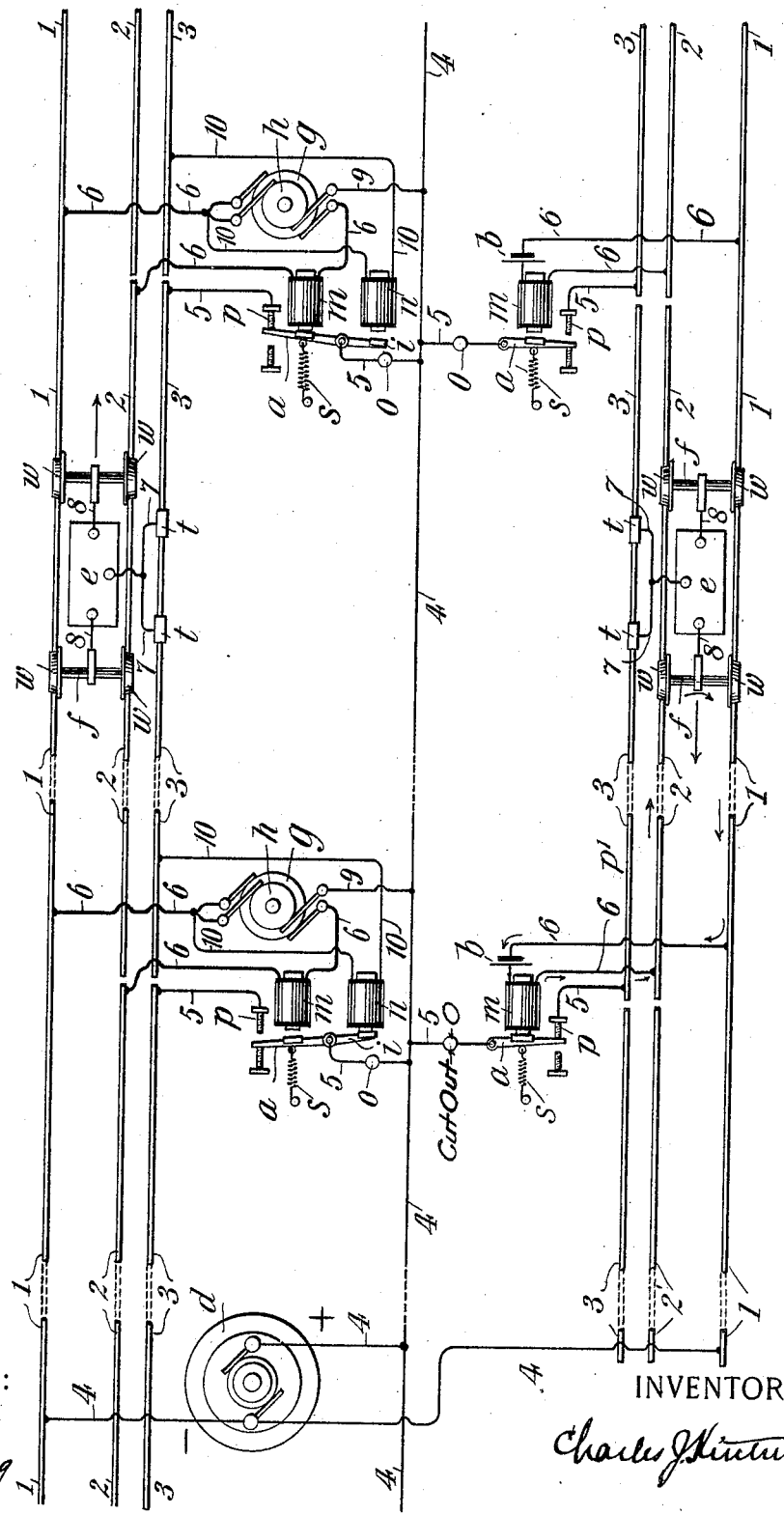
WITNESSES:
C. E. Ashley
M. J. Keating
INVENTOR
Charles J. Kintner

UNITED STATES PATENT OFFICE.

CHARLES J. KINTNER, OF NEW YORK, N. Y.

SECTIONAL THIRD-RAIL SYSTEM OF ELECTRIC RAILWAYS.

No. 828,747.　　　　　Specification of Letters Patent.　　　Patented Aug. 14, 1906.

Application filed October 13, 1903. Renewed January 24, 1906. Serial No. 297,611.

*To all whom it may concern:*

Be it known that I, CHARLES J. KINTNER, a citizen of the United States, residing in New York, borough of Manhattan, county and State of New York, have made a new and useful Invention in Sectional Third-Rail Systems of Electric Railways, of which the following is a specification.

My invention has for its objects, first, to provide means whereby any sectional third rail or conductor of a system of electric railways of the third-rail type may be connected to and disconnected from a current feeder or main through the agency of switching mechanism controlled or operated by electrical currents passing through the tram-rails and wheels and axles of the cars; second, to so arrange a double-track system of electric railways of the sectional third-rail type that the sectional third rails or conductors of either track may be connected to and disconnected from the current feeder or main through the agency of switching mechanism controlled by electrical currents passing through the wheels and axles and tram-rails of both tracks; third, to provide means for connecting any sectional third rail of a system of electric railways of the sectional third rail or conductor type with the current feeder or main by switching mechanism through the agency of currents passing through the wheels and axles and tram-rails of the system and to combine therewith automatic overload or cut-out switches adapted to cut out any sectional conductor or third rail over which a car or train may be passing when the current delivered to the motors on board of said car or train becomes abnormal; fourth, to provide a system of electric railways of the sectional third-rail type with means for connecting the sectional third rails or conductors to and disconnecting them from the current feeder or main through the agency of switching mechanism controlled or operated by currents passing through the tram-rails and wheels and axles of the cars and said switching mechanism and to combine therewith means for preventing a sectional third rail in the rear of one over which a car or train is passing from being connected to the feeder until the preceding car shall have passed off the section in advance.

In electric railways of the sectional third rail or conductor type as heretofore devised the sectional third rails or conductors have been connected to the current feeder or main as a car or train passes over the road and disconnected therefrom either through the agency of mechanical means carried by the car or train or through the agency of a part of the working current acting upon electromagnets at definite points, dependent upon the length of the sectional third rails or conductors. Such systems, however, are open to the objection that in the use of mechanical means carried by the cars there is much wear and tear to the switching apparatus, and this type, as well as those in which the switches are controlled by a part of the working current, are both open to the objection that serious arcing often results at the switching terminals, and other defects are found to exist which in a measure preclude the successful use of such systems.

An electric-railway system of the sectional third-rail type has heretofore been devised in which both of the track-rails were divided into sections insulated from each other and double or duplex sectional third rails equal in length to such sectional track-rails were utilized in connection with an alternating current power-house generator connected to two current feeders or mains extending wholly over the route to which were connected in turn in multiple-arc relation the primaries of converters, the secondary circuits of which were of relatively low resistance and included switching-electromagnets, the opposite ends of such secondaries being connected directly to the pairs of sectional tram or track rails and the armatures of the switching-magnets included in open circuit between the current-feeders and the pairs of sectional third rails. It has also been proposed to divide both tram or track rails into sections and to connect the opposite ends thereof, respectively, with switching-electromagnets and the secondary coils of converters, the primaries of which were connected in multiple-arc relation with a high-potential circuit controlled or operated directly by the power-house generator, the armatures of the switching-magnets being so arranged as to connect sectional third rails to the current feeder or main when a car was passing over the route, the wheels and axles of said cars short-circuiting the low-voltage currents passing through the switching-magnets and the sectional track-rails. It has also been proposed to divide both tram or track rails into pairs of insulated sections and to include between such sectional track-rails switching-electromagnets which are actuated or operated by low-voltage batteries carried one upon each car and so arranged that the circuit was closed from the batteries through the switching-magnets and the wheels and axles as the car passed from section to section. Such an arrangement necessarily contemplates the use of a large number of batteries—namely, one for each car. It also necessitates the dividing of the track-rails into short sections not exceeding the length of the car, or, rather, the distance between any two pairs of trucks.

A sectional third-rail system has also been devised in which one of the track-rails is electrically continuous throughout its length and the other track-rail divided into sections corresponding in length with sectional third rails located between the track-rails, switching-electromagnets being located in pairs in switch-boxes at the ends of each section and a battery carried by each car, so connected with the tram-wheels that when a car is standing upon a section the circuit is closed through the wheels and axles, the sectional track-rail, and the corresponding switching-magnet, the current from the battery returning by the wheels and axles resting upon the continuous track-rail. Such a system necessitates the use of a portable battery upon each car or train and the use of two sets of switching devices in each switch-box in order to enable cars to travel in opposite directions or to back from one section to another, while with my improvement by locating the batteries beside the track, one for each section, I am enabled to utilize a single switch for each section no matter in which direction a car may be traveling.

My invention contemplates generically the utilization of the wheels and axles of a car or train and of the tram-rails themselves for operating the switches through the agency of electrical currents of such low voltage that there will be little or no leakage between the rails, the circuit at all times being open for the switching apparatus except when a car or train is passing over any given section or part of the road. For the purpose of effecting this result I divide one of the tram-rails into sections of any convenient length, insulating the adjoining ends from each other in the same manner as is usually done with railway-signals which are operated by low-voltage currents and electromagnetic apparatus controlled through the agency of such currents passing through the sectional tram-rails of the road and the wheels and axles of the cars, and I so connect the circuit with electromagnetic switching devices that the sectional third rails or conductors are successively connected to and disconnected from the current feeder or main as the cars or trains pass over the road, and I so arrange the current-collectors or trolley-shoes with relation to the wheels and axles of each motor-car that the next sectional conductor in advance of a car is always connected to the current feeder or main before the current-collectors or trolley-shoes leave the section last passed over, the rear car-wheels always leaving the section after the current-collector or shoe has passed from off the corresponding third rail, no matter in which direction the car or train may be moving.

For a full and clear understanding of my invention, such as will enable others skilled in the art to construct and use the same, reference is had to the accompanying drawing, which is a diagrammatic view of the invention in connection with a double-track system of electric railways, the switching mechanism of the upper track being controlled by low-voltage currents generated from the generator parts of motor-generators, the motor parts of which are connected, preferably, in multiple directly with the power-house generator, safety mechanism being also illustrated, in connection with the track shown on the upper side of the drawing, for preventing any car or train following a preceding car from coming into collision therewith, the lower portion of the drawing illustrating a modified form of this invention in which local batteries located at intervals along the route are utilized to control the switches.

Referring now to the drawing in detail, in which like letters and numerals of reference represent like or equivalent parts wherever used, $d$ represents the power-house dynamo or generator of usual type having its positive pole connected to a current feeder or main 4, extending over the road, and its negative pole connected to the outer tram or track-rails 1 1 of a double-track system of railways, said outer tram or track rails being electrically continuous throughout the system.

2 2 2 represent the inner tram or track rails which are divided into sections at proper intervals and insulated from each other at their ends in the same manner that the tram or track rails of steam-railways are now ordinarily divided for signaling purposes.

3 3 3 represent sectional third rails of each track of the same length as the sectional tram-rails 2 2 2.

5 5 5 5 are normally open branch feeders connected on one side to switch-armature levers $a$ $a$, held in their open positions by springs $s$ $s$ against back-stops, as shown, so that all of the sectional conductors 3 3 3 are normally dead or without current-potential.

$p$ $p$ $p$ $p$ are front contact-stops and $o$ $o$ $o$ $o$ fuse-boxes inclosing overload or cut-out switches of any well-known form designed to automatically cut out of circuit the sectional third rails for an abnormal working current.

6 6 are low-resistance conductors electrically connected on one side to the outer tram or track rails and on the other to the sectional tram or track rails.

$w\ w\ w\ w$ and $f\ f$ represent the wheels and axles of each car or train, and $e$ a propelling electric motor located thereon.

$t\ t$ represent the current-collectors or trolley-shoes, which are so located with relation to each car or train that no matter in which direction the same may be traveling the last pair of wheels will leave the end of the sectional tram-rails after the last current collector trolley-shoe $t$ has passed off the corresponding sectional third rail or conductor.

7 7 are service-conductors connecting the current-collectors or trolley-shoes $t$ to the controller for the motor $e$.

8 8 are the usual earth-wire circuits running from the motor $e$ to the axles $f$ and wheels $w\ w$, and hence to the common return tram or track rail 1.

$h\ h$ represent the motor parts of motor-generators located, preferably, in multiple-arc branch circuits 9 9, connected to the feeder 4 and, through the conductors 6 6, to the return tram or track rail 1.

$m\ m$ represent the switching-magnets, which are connected directly to the generator parts $g$ of the motor-generators and the continuous tram or track rail on one side and the corresponding sectional tram or track rail on the other.

$n\ n$ represent safety-magnets connected in circuit with the sectional third rails on one side and with the continuous tram or track rail on the other.

$a\ a$ represent the switch-armature levers, which in this instance are pivoted at their centers and are provided with short armature-levers $i\ i$, having armatures normally located in the magnetic field of the safety-magnets $n\ n$.

The lower part of the drawing illustrates the lower track with a car traveling from right to left and with a modified system of switch-control in which the motor-generators, hereinbefore described, are replaced by local batteries $b$, one for each section, and included in normally open circuits with the corresponding sectional and continuous track-rails, the circuit relations thereof, with the accompanying sectional third rail to the feeder, being apparent on inspection of the drawing.

The operation of that part of the system connected with the upper track is as follows: A car is seen passing from left to right in the direction of the arrow. The motor parts $h\ h$ of the motor-generators are receiving current from the positive pole of the power-house dynamo $d$ by way of the current-feeder 4 in multiple-arc circuit through conductors 9 and 6 to the continuous track-rail 1, connected to the negative pole thereof. The generators $g\ g$ of the motor-generators will generate currents of low voltage when the track-circuits are closed, as is the case with the central section where the car is now located. A branch thereof is flowing from the extreme right-hand motor-generator by way of the conductor 6, continuous track-rail 1, front axle and wheels $w\ w$, sectional track-rail 2, conductor 6, switch-magnet $m$, thereby causing the armature-lever $a$ of the right-hand switch to be drawn to its forward position into contact with the stationary contact $p$, so that the working current is closed from the power-house generator and feeder 4 by the branch feeder 5, automatic cut-out in the box $o$, armature-lever $a$, contact $p$, branch feeder 5, sectional third rail 3, trolley-shoes $t\ t$, service-conductors 7 7, to the controller of the motor $e$, conductors 8, to the axles $f f$ and wheels $w\ w$ on the car by way of the continuous track-rail to the negative pole of the generator. Consequently the car continues to advance from left to right so long as the controller is taking current. At the same time a multiple-arc branch of the working current is closed from the rear end of the sectional third rail 3, over which the car is passing by way of conductor 10, safety-magnet $n$, conductor 6, continuous track-rail 1 to the power-house generator, thus causing the safety-magnet $n$ to act upon the armature-lever $i$ in conjunction with the retractile spring $s$, acting on the arm $a$, so that should a car following the car shown upon the drawing enter upon the next section in the rear and close the low-voltage circuits to the switching-magnet $m$ for that section the switch will not be operated, and hence the following car will stop for lack of current.

The modified form of switch-control shown in the lower half of the drawing is not provided with safety appliances for preventing rear-end collisions, and its operation is obvious, the left-hand switch being closed by reason of the presence of a car moving from right to left on the corresponding section, the local battery-current for that switch flowing from battery $b$ through contact 6, magnet $m$, the sectional and continuous track-rails 3 and 1, and wheels and axles of the car closes the current from feeder $f$ through branch feeder 5, cut-out in box $o$, switch-lever $a$, contact $p$, to sectional third rail or conductor 3, thence through the motor $e$, as before, and wheels and axles $w\ w\ f$ of the car to the lower continuous track-rail 1 to the negative pole of the generator. Consequently the car may move in either direction and the sectional third rails be made alive or dead as it passes over the route and without arcing.

I do not limit my invention to the details of construction illustrated in the accompanying drawing, as a number of the features thereof may be materially departed from and still come within the scope of my claims hereinafter made.

I believe it is broadly new with me to divide the third rail into insulated sections 3 3 3, one of the track or service rails into corresponding sections 2 2 2, the other track-rail 1 being electrically continuous throughout its length and connected to one pole of the power-house dynamo, and to combine therewith switching devices and low-voltage generators connected permanently in circuit with the sectional track-rails and the continuous track-rail, which switching devices automatically connect the current-feeder connected to the other pole of the power-house dynamo directly to the sectional third rails and disconnect them therefrom as a car passes over the route. I believe it is also new with me to combine in a sectional third-rail system low-voltage generators located at intervals along the route and included in circuit with sectional track-rails and switching devices for connecting the sectional conductors in sequence to and disconnecting them from the power-house generator and to combine therewith safety devices which prevent any sectional conductor from being connected to the current-feeder or main during the time that the next sectional conductor in advance is connected thereto, and my claims are generic as to this feature.

I make no claim in the present application to an electric railway of the sectional third-rail type having a series of sectional track-rails, a series of sectional third rails, a current feeder or main, and a series of switching devices included in circuit with the sectional track-rails and electrical generators of relatively low voltage which are wholly out of control of or disconnected from the power-house generator when in operation, nor do I claim herein such features in combination with safety devices designed to prevent rear-end collisions, as the same are made in part the subject-matter of a separate application filed by me in the United States Patent Office on the 5th day of December, 1903, and bearing Serial No. 183,882.

Having thus described my invention, what I claim, and desire to secure by Letters Patent of the United States, is—

1. An electric-railway system embracing a current feeder or main; a series of sectional third rails or conductors; a line of sectional tram or track rails, and an electrically-continuous tram or track rail; in combination with switching devices having electrical connections with electrical generators located at intervals along the route, the sectional tram or track rails the continuous tram or track rail and the wheels and axles of a car, whereby the presence of a car upon any section maintains the corresponding sectional conductor in electrical connection with the feeder through the agency of currents flowing through the switch-controlling devices, the tram or track rails and the wheels and axles of the car.

2. An electric-railway system having a series of sectional tram or track rails; an electrically-continuous tram or track rail connected to one pole of the power-house generator; a series of sectional third rails and a series of switches included in low-voltage electrical circuits, one for each section; together with a feeder or main connected to the other pole of the power-house generator and having normally open branch feeder-circuits connected to the sectional third rails or conductors and adapted to be closed by low-voltage currents passing through the wheels and axles of a car and the sectional and continuous tram or track rails.

3. A double-track system of electric railways having a common current feeder or main and connected to one pole of the power-house generator; a series of sectional track-rails and a series of sectional third rails for each track; in combination with electrical generators and electrically operated or controlled switches for each track so arranged that the same are operated by the passage of cars through the agency of electrical currents passing through the track-rails and the wheels and axles of a car as it passes over the route, the remaining track-rail of each track being electrically continuous throughout its length and connected to the other pole of the power-house generator.

4. In an electric-railway system a current feeder or main; a series of sectional third rails or conductors and a series of sectional tram or track rails electrically connected to the switches and to the other tram or track rail which is electrically continuous throughout its length and connected to one pole of the power-house generator, in combination with electrical generators located at intervals along the route and having normally open circuit connections between the feeder and the sectional third rails; together with over-load switches or cut-out devices located in circuit with the sectional third rails.

5. In an electric-railway system a current feeder or main; a series of sectional third rails or conductors and switches for connecting the same to and disconnecting them from the current feeder or main; a series of sectional tram or track rails electrically connected to the switches and to electrical generators located at intervals along the route; and an electrically-continuous tram or track rail connected to one pole of the power-house generator in combination with current-collectors carried by a car and adapted to break circuit with the last sectional third rail passed over before the last pair of wheels of the car or train leaves the section, no matter in which direction it may be traveling.

6. In a system of electric railways a current feeder or main; a series of sectional third rails or conductors; a continuous tram or track rail connected to one pole of the power-house generator; a series of sectional tram or track rails and a series of switches for connecting the sectional third rails to and disconnecting them from the feeder or main; said switches being included in circuit with the sectional track-rails and the continuous track-rail; in combination with safety mechanism connected in circuit with the continuous tram or track rail when the corresponding third rail is made alive, the switches being all actuated by currents passing through the track-rails and the wheels and axles of a car as it passes over the route.

7. In an electric-railway system a current feeder or main; a series of sectional third rails or conductors normally disconnected therefrom, and a series of switches for connecting said sectional conductors to and disconnecting them from the current feeder or main, said switches being controlled by electromagnets and low-voltage electrical generators connected in normally open sectional tram or track rail circuits and adapted to be closed by the wheels and axles of a car as it passes over the track in either direction; in combination with means for preventing a sectional third rail in the rear of one over which the car is for the time being passing from being connected to the feeder until said car shall have passed off the section in advance.

8. In an electric-railway system a current feeder or main; a series of sectional third rails or conductors normally dead; electromagnetic switches for connecting the same to and disconnecting them from the current feeder or main; circuit-closing conductors for the switches adapted to make continuous electrical contact with the wheels of a car so long as it stands upon or moves over any section; in combination with a series of electrical generators, one for each section, included in circuit with the aforesaid circuit-closing conductors and accompanying switch-controlling magnets; together with a car provided with a propelling-motor, circuits and circuit connections, and a double or two-part current-collector located between the wheels of the car in such relation thereto that a continuous supply of current is afforded to the motor and each sectional third rail or conductor is disconnected from the feeder without arcing, substantially as described.

In testimony whereof I have signed my name to this specification in the presence of two subscribing witnesses.

CHARLES J. KINTNER.

Witnesses:
JAMES P. J. MORRIS,
M. F. KEATING.